United States Patent
Prendergast et al.

(10) Patent No.: US 9,496,932 B1
(45) Date of Patent: Nov. 15, 2016

(54) SYSTEMS AND METHODS OF DYNAMIC MIMO ANTENNA CONFIGURATION AND/OR RECONFIGURATION FOR PORTABLE INFORMATION HANDLING SYSTEMS

(71) Applicants: Liam Prendergast, Limerick (IE); Benny Bologna, Austin, TX (US)

(72) Inventors: Liam Prendergast, Limerick (IE); Benny Bologna, Austin, TX (US)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 14/717,469

(22) Filed: May 20, 2015

(51) Int. Cl.
    *H04B 7/02*     (2006.01)
    *H04B 7/04*     (2006.01)
    *H04W 72/04*     (2009.01)
    *H04W 72/08*     (2009.01)

(52) U.S. Cl.
    CPC ....... *H04B 7/0417* (2013.01); *H04W 72/0453* (2013.01); *H04W 72/082* (2013.01)

(58) Field of Classification Search
    USPC ........................................................ 375/267
    See application file for complete search history.

(56) References Cited

U.S. PATENT DOCUMENTS

| | | | | |
|---|---|---|---|---|
| 7,912,024 B2 * | 3/2011 | Trachewsky | ......... | H04B 7/0697 370/208 |
| 8,064,838 B2 * | 11/2011 | Hailey | ................... | H04B 15/02 361/816 |
| 8,077,805 B1 * | 12/2011 | Sarrigeorgidis | ...... | H04L 25/022 375/316 |
| 8,526,380 B1 * | 9/2013 | Shah | .................... | H04W 72/048 370/329 |
| 2002/0061031 A1 * | 5/2002 | Sugar | .................... | H04W 16/14 370/466 |
| 2003/0207668 A1 * | 11/2003 | McFarland | .......... | H03H 7/0153 455/3.01 |
| 2004/0259518 A1 * | 12/2004 | Aktas | ....................... | H03D 7/18 455/323 |

(Continued)

OTHER PUBLICATIONS

Buffalo, Buffalo Technology, "Understanding and Optimizing 802.11n" Jul. 2011, 8 pgs.

(Continued)

*Primary Examiner* — Daniel Washburn
*Assistant Examiner* — Berhanu Tadese
(74) *Attorney, Agent, or Firm* — Egan Peterman Enders Huston (57) ABSTRACT

Systems and methods may be implemented with MIMO antenna architectures (e.g., such as 2×2, 3×3, 4×4, etc.) of a given mobile information handling system to selectively use dynamic MIMO configuration and/or reconfiguration to select only a subset of the available multiple antenna elements or all of the available multiple antenna elements for receive and/or transmit operation based on the interference characteristics of the given mobile information handling system and/or based on the current radio frequency (RF) band currently being used for wireless communications by the mobile information handling system.

20 Claims, 5 Drawing Sheets

(56) References Cited

U.S. PATENT DOCUMENTS

| | | | | |
|---|---|---|---|---|
| 2006/0233191 | A1* | 10/2006 | Pirzada | H04W 88/00 370/463 |
| 2006/0252418 | A1* | 11/2006 | Quinn | H04W 16/10 455/423 |
| 2008/0146269 | A1* | 6/2008 | Pirzada | H04B 1/005 455/552.1 |
| 2008/0238794 | A1* | 10/2008 | Pan | H01Q 9/145 343/767 |
| 2008/0300009 | A1* | 12/2008 | Quinn | H01Q 1/2258 455/553.1 |
| 2009/0135754 | A1* | 5/2009 | Yavuz | H04W 74/04 370/311 |
| 2009/0164954 | A1* | 6/2009 | Yamagajo | H01Q 1/2208 716/132 |
| 2009/0284416 | A1* | 11/2009 | Quinn | H01Q 1/2258 342/377 |
| 2010/0177000 | A1* | 7/2010 | Brisebois | H01Q 3/04 343/703 |
| 2010/0234071 | A1* | 9/2010 | Shabtay | H04B 7/0408 455/562.1 |
| 2012/0320874 | A1* | 12/2012 | Li | H04W 48/12 370/331 |
| 2013/0089078 | A1* | 4/2013 | Liu | H04L 1/1819 370/335 |
| 2013/0120191 | A1* | 5/2013 | Zhang | H04B 7/0469 342/377 |
| 2013/0128783 | A1* | 5/2013 | Le Naour | H04W 52/02 370/281 |
| 2013/0178172 | A1* | 7/2013 | Rutledge | H04B 1/006 455/77 |
| 2013/0315076 | A1* | 11/2013 | Zhao | H04B 7/082 370/252 |
| 2013/0315117 | A1* | 11/2013 | Le Naour | H04B 1/44 370/297 |
| 2013/0315141 | A1* | 11/2013 | Homchaudhuri | H04W 88/06 370/328 |
| 2014/0169317 | A1* | 6/2014 | Gao | H04B 7/0404 370/329 |
| 2014/0192845 | A1* | 7/2014 | Szini | H04B 7/0413 375/219 |
| 2014/0233416 | A1* | 8/2014 | Black | H04W 72/085 370/252 |
| 2014/0355527 | A1* | 12/2014 | Vaidya | H04W 76/025 370/329 |
| 2015/0049616 | A1* | 2/2015 | Ho | H04W 24/02 370/252 |
| 2015/0085844 | A1* | 3/2015 | Tian | H04W 48/16 370/338 |
| 2015/0110049 | A1* | 4/2015 | Pabla | H04B 7/0697 370/329 |
| 2015/0117421 | A1* | 4/2015 | Kim | H04W 84/12 370/338 |
| 2015/0271010 | A1* | 9/2015 | Shetty | H04L 41/0803 709/220 |
| 2015/0288599 | A1* | 10/2015 | Zhou | H04L 45/245 370/338 |
| 2015/0289299 | A1* | 10/2015 | Abraham | H04W 12/04 370/328 |
| 2015/0311943 | A1* | 10/2015 | Quinn | G06F 3/0601 455/77 |
| 2015/0312891 | A1* | 10/2015 | Quinn | H04W 4/02 455/452.1 |

OTHER PUBLICATIONS

Chaskar, Wireless, AirTight Networks Blog, , Oct. 18, 2012, 5 pgs.
Wikipedia, "Mimo" Printed From Internet Apr. 28, 2015, 15 pgs.

* cited by examiner

SYSTEMS AND METHODS OF DYNAMIC MIMO ANTENNA CONFIGURATION AND/OR RECONFIGURATION FOR PORTABLE INFORMATION HANDLING SYSTEMS

FIELD OF THE INVENTION

This invention relates generally to portable information handling systems and, more particularly, to antenna configuration for wireless transmission from information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Multiple-input and multiple-output (MIMO) wireless technology is used to multiply the capacity of a radio link using multiple transmit and receive antennas for wireless communication to and from mobile information handling systems, including wireless communication using 802.11 Wi-Fi standards, HSPA+(3G), WiMAX (4G), and Long Term Evolution (4G). MIMO technology employs multiple antennas at both the transmitter and the receiver to send and receive multiple data signals on the same radio channel at the same time via multipath propagation. Conventional MIMO mobile computing product designs for information handling systems include those that target a 3×3 Wi-Fi antenna solution that employ three co-located Wi-Fi antenna elements that are installed in a small space on a mobile information handling system such as a laptop computer. Multiple MIMO antenna elements typically need to have at least a one quarter wavelength separation distance from each other to secure satisfactory antenna isolation for 2.4 GHz Wi-Fi band operation, while also requiring a similar separation distance from nearby metallic objects such as hinges, and from known noise sources such as embedded display port (eDP) cables and connectors.

SUMMARY

Disclosed herein are systems and methods that may be implemented with MIMO antenna architectures (e.g., such as 2×2, 3×3, 4×4, etc.) of a given mobile information handling system to selectively use dynamic MIMO configuration and/or reconfiguration to select only a subset of the available multiple antenna elements based on the interference characteristics of the given mobile information handling system and/or based on the current radio frequency (RF) band currently being used for wireless communications by the mobile information handling system. In this regard, the disclosed systems and methods may be implemented to select different groups of currently-active antenna elements for use with different respective identities of information handling system configurations (e.g., each configuration identity having different RF interference characteristics), and/or to select different groups of currently-active antenna elements for use with different respective RF frequency bands currently utilized by a given information handling system configuration. Such selection may be made in one embodiment to achieve a reduction in the potential for RF interference imparted to RF communications at a RF frequency band that is currently utilized by the mobile information handling system configuration.

In one embodiment, the disclosed systems and methods may be implemented to automatically and dynamically select only a portion of the total number of antenna elements of an information handling system for MIMO operation in more interference-sensitive RF frequency bands and for information handling system configurations having relatively greater RF interference characteristics at such more interference-sensitive RF bands, while a larger number of the total number of antenna elements may be selected for MIMO operation in less interference-sensitive RF bands and for information handling system configurations having relatively less or no RF interference characteristics at such less interference-sensitive RF bands.

For example, in one exemplary embodiment, the disclosed systems and methods may be implemented to select a subset of antenna elements (e.g., two antenna elements of a 3×3 MIMO configuration) to be driven for 2.4 GHz Wi-Fi 802.11ac and 802.n frequency band operation that are furthest from an embedded display port (eDP) or other RF noise source (e.g., such as broadband noise source, clock frequency harmonics from system components such as display panels and display cables/connectors, system clocks, graphics/CPU chips, high speed transmission lines, other system antennas, etc.) of an information handling system, while selecting all antenna elements (e.g., all three antenna elements of the 3×3 MIMO configuration) of the same information handling system to be driven for 5 GHz Wi-Fi 802.11ac and 802.11n frequency band operation. Thus, in one embodiment, the disclosed systems and methods may be implemented to intelligently provide a dynamic solution for information handling systems to deliver best possible MIMO performance by using a greater number (or all) of available antenna elements while operating in a less interference-sensitive frequency band (e.g., such as a 5 GHz Wi-Fi band), while at the same time avoiding or substantially reducing noise interference due to close proximity of one or more of the available antenna elements to noise sources (e.g., such as embedded display port components) when operating in a more interference-sensitive frequency band (e.g., such as a 2.4 GHz operating band). In this way, the disclosed systems and methods may be implemented in one embodiment to intelligently address and prevent or substantially reduce interference problems that may impact performance of a given mobile information handling system configuration that is designed to support multiple antennas to deliver best-in-class MIMO (e.g., 3×3 Wi-Fi 1 1ac) end user performance. Thus, for example, the disclosed dynamically configurable and/or reconfigurable MIMO topology allows for maximum MIMO 3×3 5 GHz antenna performance, while isolating 2.4 GHz band from noise sources.

In one exemplary embodiment, a wireless radio module (e.g., such as a Wi-Fi module) may be provided having at least one processing device that is configured to execute software, firmware or other dynamic MIMO configuration logic that is configured to query and determine the identity of a current information handling system design or configuration into which the radio module is installed, and to then respond to this determined identity by only enabling antenna reconfiguration aspects of the dynamic MIMO configuration logic on the identified current information handling system if the wireless performance (e.g., wireless 802.11n/ac performance) of the current system is capable of benefiting from the dynamic reconfiguration methodology. Thus, for example, existing dynamic MIMO reconfiguration logic of a radio module may only activate antenna reconfiguration capability at system build time or any other time when the radio module is installed in a given information handling system design having a MIMO antenna configuration that exhibits particular RF interference characteristics for one or more RF frequency bands, but not activated when the same radio module is installed in another given information handling system design that has a MIMO antenna configuration that exhibits reduced or substantially no RF interference characteristics for one or more RF frequency bands.

One example of an information handling system design having a MIMO antenna configuration that exhibits RF interference characteristics for one or more RF frequency bands is an end-user computing (EuC) system including a MIMO configuration that employs multiple antennas that are co-located in a relatively small cavity of a mobile information handling system chassis with strong proximity effects. Examples of such MIMO configurations include, but are not limited to, 3×3 Wi-Fi 802.11ac applications, or any other MIMO Wi-Fi application employing a greater or lesser number of co-located multiple antennas, e.g., co-located within a hinge-cap cavity of a mobile information handling system cavity. Since the disclosed systems and methods may implemented to dynamically select only those co-located antennas of a system that are suitably spaced from each other and/or from RF noise sources (e.g., such as integral eDP components of the system that are transmitting audio signals, video signals, data signals or a combination thereof) to ensure little or substantially no interference for a current wireless frequency band, the co-located antennas of the system may be physically placed at a relatively close distance to each other and/or to any eDP noise source to satisfy substantially noise free operation for a most noise-resistance frequency band (e.g., such as 5 GHz Wi-Fi 802.11ac/n operation), while also enabling substantially noise free operation for less noise resistance frequencies (e.g., such as 2.4 GHz Wi-Fi 802.11ac/n operation) by dynamically only selecting a subset of the co-located antennas for the less noise resistance frequencies.

In one embodiment, dynamic MIMO configuration and/or reconfiguration may be implemented to ensure that design requirements for smaller information handling system platforms are met for the less noise resistant frequencies without the need for physically placing multiple co-located antennas (e.g., for 3×3 MIMO or higher order MIMO antenna configurations placed in the hinge cavity of a small information handling system platform) at a known increased minimal separation distance from the eDP connector for noise mitigation in the less noise resistant frequencies (e.g., 2.4 GHz band), reducing the number of co-located MIMO antenna elements, or co-locating only some (e.g., two) of the Wi-Fi antenna elements in a constrained cavity space of a smaller system and placing other (e.g., a third) antenna elements in a different location on the platform, as would be typically required for a conventional information handling system. In this regard, such conventional solutions for this potential interference problem at less noise resistant RF frequencies would be to reduce the desired number of MIMO antennas in a manner that fails to meet design specifications for smaller system platforms and/or to reduce isolation between the co-located antennas such that MIMO performance is compromised, leading to degraded end user wireless performance and/or resulting in unacceptable industrial design (ID), mechanical engineering (ME) and cost impacts for such conventional information handling systems that do not employ the dynamic MIMO configuration and/or reconfiguration disclosed herein.

In one respect, disclosed herein is a mobile information handling system, including: a host processing device; at least two available multiple input, multiple output (MIMO) antenna elements; and at least one radio module coupled between the host processing device and each of the available MIMO antenna elements, the radio module including at least one processing device and being configured to process and combine separate RF signals received in at least a common first frequency band from each of the available MIMO antenna elements to produce incoming data provided to the host processing device, and/or to process outgoing data provided from the host processing device to produce and transmit separate RF signals in the common first frequency band from each of the available MIMO antenna elements. The processing device of the radio module may be configured to determine the identity of a system chassis configuration of the mobile information handling system, and to then respond in real time to this determined identity by at least one of: dynamically configuring and/or reconfiguring a subset of the available MIMO antenna elements that are actively utilized to receive separate RF signals in the common first frequency band based on the determined identity of the system chassis configuration and based on the identity of the common first RF frequency band to achieve a reduction in the amount of RF interference imparted to RF signals of the common first frequency band that are received by the subset of available MIMO antenna elements as compared to the amount of RF interference imparted to RF signals of the common first frequency band when the RF signals of the common first frequency band are received by all of the available MIMO antenna elements; or dynamically configuring and/or reconfiguring a subset of the available MIMO antenna elements that are actively utilized to transmit separate RF signals in the common first frequency band based on the determined identity of the system chassis configuration and based on the identity of the common first RF frequency band to achieve a reduction in the amount of RF interference imparted to RF signals of the common first frequency band that are transmitted by the subset of available MIMO antenna elements as compared to the amount of RF interference imparted to RF signals of the common first frequency band when the RF signals of the common first frequency band are transmitted by all of the available MIMO antenna elements; or a combination thereof.

In another respect, disclosed herein is a method of operating a mobile information handling system, including using at least one processing device of a radio module of the information handling system to: process and combine separate RF signals received in at least a common first frequency band from each of at least two available multiple input, multiple output (MIMO) antenna elements to produce incoming data provided to a host processing device of the information handling system, and/or to process outgoing data provided from the host processing device to produce and transmit separate RF signals in the common first frequency band from each of the available MIMO antenna elements; determine the identity of a system chassis configuration of the mobile information handling system; and then respond in real time to the determined identity by at least one of: dynamically configuring and/or reconfiguring a subset of the available MIMO antenna elements that are actively utilized to receive separate RF signals in the common first frequency band based on the determined identity of the system chassis configuration and based on the identity of the common first RF frequency band to achieve a reduction in the amount of RF interference imparted to RF signals of the common first frequency band that are received by the subset of available MIMO antenna elements as compared to the amount of RF interference imparted to RF signals of the common first frequency band when the RF signals of the common first frequency band are received by all of the available MIMO antenna elements; or dynamically configuring and/or reconfiguring a subset of the available MIMO antenna elements that are actively utilized to transmit separate RF signals in the common first frequency band based on the determined identity of the system chassis configuration and based on the identity of the common first RF frequency band to achieve a reduction in the amount of RF interference imparted to RF signals of the common first frequency band that are transmitted by the subset of available MIMO antenna elements as compared to the amount of RF interference imparted to RF signals of the common first frequency band when the RF signals of the common first frequency band are transmitted by all of the available MIMO antenna elements; or a combination thereof.

DESCRIPTION OF ILLUSTRATIVE EMBODIMENTS

Figure 1:
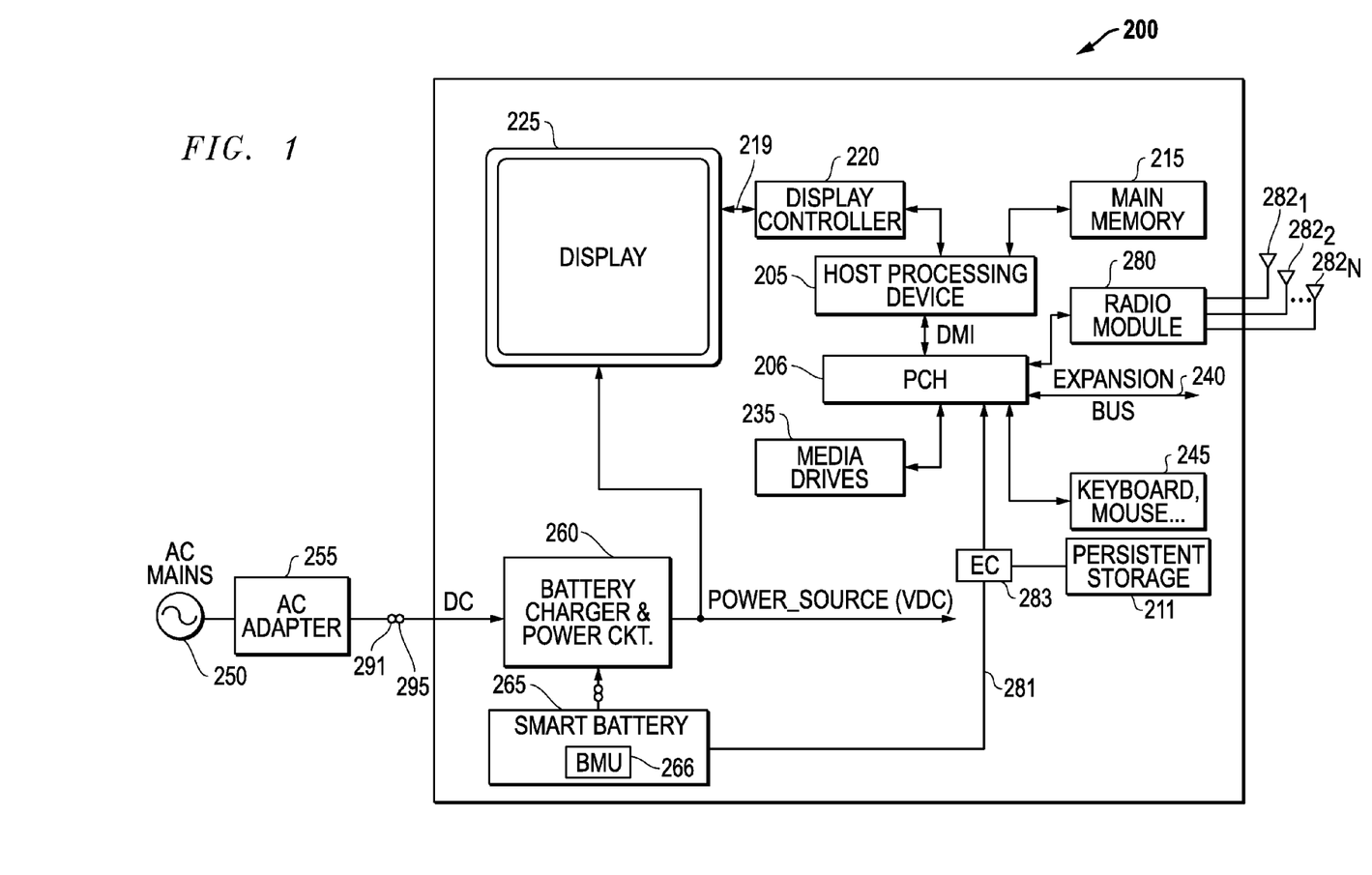
FIG. 1 illustrates a block diagram of a wireless-enabled information handling system platform according to one exemplary embodiment of the disclosed systems and methods.

FIG. 1 is a block diagram of an information handling system 200 (e.g., mobile portable information handling system such as notebook computer, MP3 player, personal data assistant (PDA), cell phone, smart phone, cordless phone, tablet computer, etc.) as it may be configured according to one exemplary embodiment of the disclosed systems and methods. As shown in FIG. 1, information handling system 200 of this exemplary embodiment includes a host processing device 205 (e.g., such as an Intel Pentium series processor, an Advanced Micro Devices (AMD) processor or one of many other processors currently available) which may be optionally coupled together with a platform controller hub (PCH) 206 for some applications. Host processing device 205 may be configured execute an operating system (OS) such as Windows-based operating system, Linux-based operating system, etc. System memory 215 (e.g., DRAM) and a display controller 220 may be coupled as shown to host processing device 205, and a display device 225 (e.g., video monitor) may be coupled to display controller 220 to provide visual images (e.g., via graphical user interface) to the user, e.g., via eDP components 219 such as eDP cable and eDP connector. Media drives 235 may be coupled as shown to host processing device 205 via PCH 206 to provide permanent storage for the information handling system.

Still referring to FIG. 1, an optional expansion bus 240 may coupled to PCH 206 to provide the information handling system with additional plug-in functionality. Expansion bus 240 may be a PCI bus, PCI Express bus, SATA bus, USB or virtually any other expansion bus. Input devices 245 such as a keyboard and mouse may be coupled via PCH 206 to host processing device 205 to enable the user to interact with the information handling system. A radio module 280 may be coupled to host processing device 205 via PCH 206, and multiple MIMO antenna elements $282_1$ to $282_N$ may in turn be coupled to radio module 280 as shown. An optional embedded controller (EC) 280 may also be coupled to PCH 206 as shown, and may be configured to perform various tasks such as battery and power management, I/O control, etc. Persistent storage 211 (e.g., embedded and partitioned flash memory, Electrically Erasable Programmable Read Only Memory—EEPROM, etc.) may be coupled to EC 280 for storing persistent information for EC 280. In the practice of the disclosed systems and methods a radio module 280 may be implemented as an installable (e.g., interchangeable) module 280 such as illustrated in FIG. 2, or may be provided to have any other suitable configuration, e.g., as any suitable combination of radio processing device and transceiver components that are either permanently or interchangeably coupled in an operative manner to other components of system 200.

In the particular embodiment of FIG. 1, information handling system 200 is coupled to an external source of power, namely AC mains 250 through AC adapter 255. It will be understood that external power may be alternatively provided from any other suitable external source (e.g., external DC power source) or that AC adapter 255 may alternatively be integrated within an information handling system 200 such that AC mains 250 supplies AC power directly to information handling system 200. As shown AC adapter 255 is removably coupled to, and separable from, battery charger/power circuit 260 of information handling system 200 at mating interconnection terminals 291 and 295 in order to provide information handling system 200 with a source of DC power to supplement DC power provided by battery cells of a battery system in the form of smart battery pack 265, e.g., lithium ion ("Li-ion") or nickel metal hydride ("NiMH") battery pack including one or more rechargeable batteries and a BMU that includes an analog front end ("AFE") and microcontroller. Further, a battery system data bus (SMBus) 281 is coupled to smart battery pack 265 to provide battery state information, such as battery voltage and current information, from BMU 266 of smart battery pack 265 to EC 280 and to other components such as processor 205. Battery charger/power circuit 260 of information handling system 200 may also provide DC power for recharging battery cells of the battery system 265 during charging operations.

When a battery system of a portable information handling system is optionally provided as a replaceable battery pack, it may be configured for insertion and removal from a corresponding battery pack compartment defined within the chassis of the information handling system (e.g., such as a notebook computer), and may be provided with external power and data connector terminals for contacting and making interconnection with mating power connector terminals and data connector terminals provided within the battery pack compartment to provide power to the system load (i.e., power-consuming components) of the information handling system and to exchange data with one or more processing devices of the information handling system.

Figure 2:
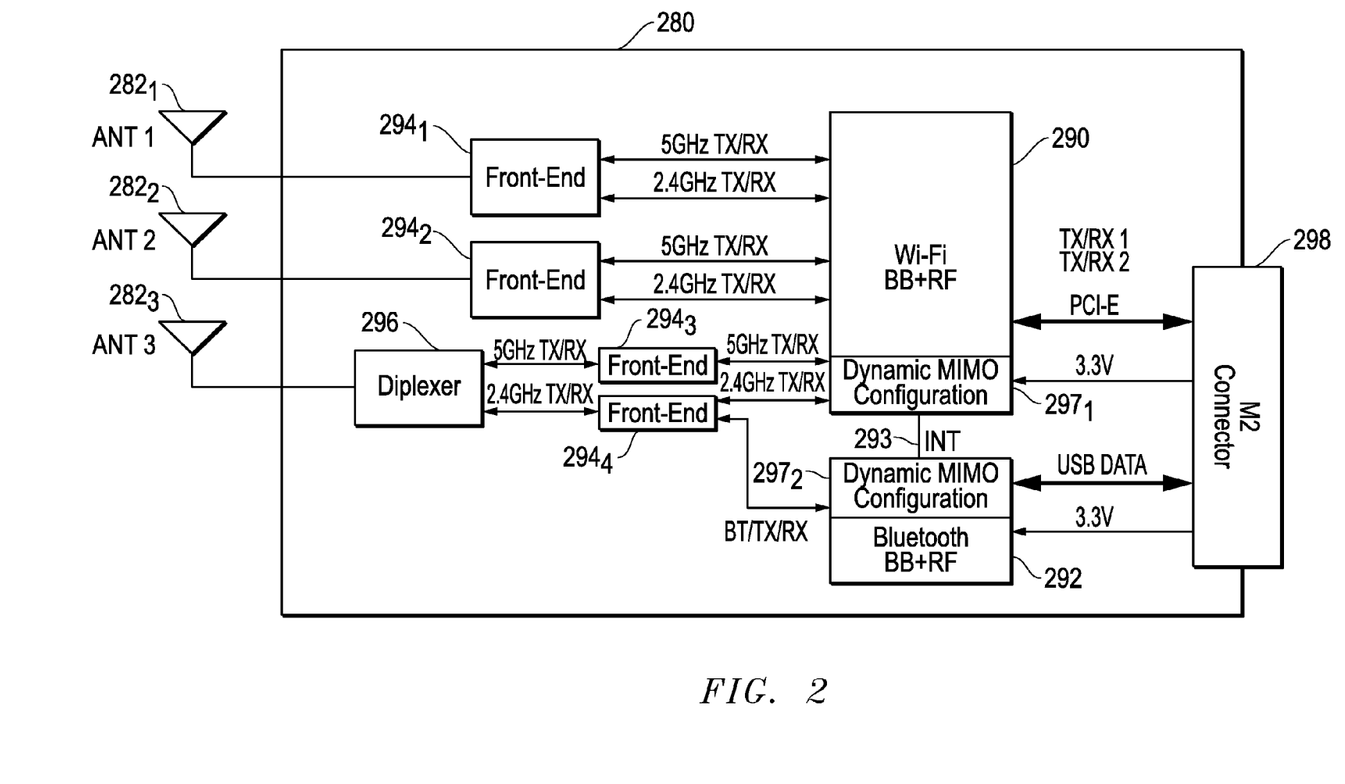
FIG. 2 illustrates a block diagram of one exemplary embodiment of a radio module according to one exemplary embodiment of the disclosed systems and methods.

FIG. 2 illustrates a block diagram of one exemplary embodiment of a radio module 280 coupled to multiple MIMO antenna elements $282_1$ to $282_N$, and that is configured to implement dynamic MIMO configuration and/or reconfiguration for antenna elements 282 in a manner as described elsewhere herein. In this exemplary embodiment, radio module 280 includes Wi-Fi (e.g., 802.11-based wireless local area network "WLAN") baseband processing device 290 and a separate Bluetooth (e.g., personal area network "PAN") baseband processing device 292 that are linked together by interface communication path 293 (e.g., such as COEX (Wi-Fi/BT Coexistence interface), etc.) to allow communication between baseband processing devices 290 and 292 for purposes of synchronized and coordinated operation between processing devices 290 and 292 to implement the MIMO reconfiguration of the disclosed systems and methods. Although the radio module 280 of this embodiment includes two separate baseband processing devices, it will be understood that the disclosed systems and methods may be implemented with one baseband processing device coupled to multiple MIMO antenna elements or with more than two baseband processing devices that are together coupled to multiple MIMO antenna elements. Moreover, it will be understood that Wi-Fi and Bluetooth are exemplary RF communication technologies only, and that radio modules capable of any one or more RF communication technologies (including or other than Wi-Fi and Bluetooth) may be employed using the disclosed systems and methods.

Still referring to FIG. 2, components of radio module 280 may be provided as an expansion card on a printed circuit board (PCB) with a suitable connector (e.g., such as M.2 edge connector) 298 that provides interconnection for radio module 280 to power circuit 260, as well as to PCH 206 and host processing device 205, via a mating edge connector. In this embodiment Wi-Fi baseband processing device communicates with host processing device 205 via PCI Express (PCI-e) data bus, while Bluetooth processing device 292 communicates with host processing device 205 via USB data bus as shown, although any other suitable data communication interface between radio module/s and host processing device/s may be employed.

Also shown in FIG. 2 are RF front ends $294_1$ and $294_2$ that are coupled between Wi-Fi baseband+RF processing device 290 and respective antenna elements $282_1$ and $282_2$, RF front end $294_3$ that is coupled between Wi-Fi baseband+RF processing device 290 and antenna element $282_3$ via diplexer 296, and RF front end $294_4$ that is coupled between antenna element $282_3$ and each of Wi-Fi baseband processing device 290 and Bluetooth processing device 292 via diplexer 296. Each of RF front ends $294_1$ and $294_2$ exchange 2.4 GHz and 5 GHz Wi-Fi transmit and receive signals with Wi-Fi baseband processing device 290 as shown. RF front end $294_3$ is configured to exchange 5 GHz Wi-Fi transmit and receive signals with Wi-Fi baseband processing device 290, while RF front end $294_4$ is configured to exchange 2.4 GHz Wi-Fi transmit and receive signals with Wi-Fi baseband processing device 290, and to exchange 2.4 GHz Bluetooth transmit and receive signals with Bluetooth baseband processing device 292. In this embodiment, diplexer 296 is also present to perform frequency domain multiplexing for 5 GHz Wi-Fi transmit and receive signals of RF front end $294_3$ and 2.4 GHz Wi-Fi or Bluetooth transmit and receive signals of RF front end $294_4$ as shown.

Each of radio transceivers in baseband+RF processing devices 290 and 292 may be configured to perform intermediate frequency (IF) to RF up conversion mixing, amplification and RF processing tasks for outgoing transmitted signals to antennas 282, and vice-versa (including down conversion) for incoming received signals from antennas 282. Besides IF, transceivers in baseband+RF processing devices 290 and 292 may perform up conversion and down conversion between RF and other suitable frequencies for processing by baseband processing devices 290 and 292, e.g., such as zero-IF frequency, baseband frequency, etc. In this regard, baseband processing devices 290 and 292 (e.g., digital signal processor "DSP" or other suitable radio module or processing device/s) may each be coupled to exchange outgoing and incoming IF or other suitable signals with front ends 294 through respective digital-to-analog (DAC) and analog-to-digital (ADC) converters (not shown). Baseband processing devices 290 and 292 may be configured to manage RF signal transmission and reception, as well as to perform tasks including signal processing, encoding, frequency shifting and/or modulation operations to provide transmitted information in outgoing signals based on digital data provided by host processing device 205, and to perform signal processing, decoding, frequency shifting and/or demodulation operations to obtain the message content in the incoming signals as digital data to provide to host processing device 205. Each front end component 294 may perform transmit and receive functionality with integrated low noise amplifier to amplify attenuated receive signals, and power amplifier to amplify transmit signals to facilitate MIMO functionality and performance.

As further shown in FIG. 2, each of baseband processing devices 290 and 292 may also be configured to execute or otherwise implement dynamic MIMO configuration logic 297 (e.g., in a coordinated manner) to select only a subset of the available multiple antenna elements $282_1$ to $282_3$ based on the interference characteristics of the given mobile information handling system platform into which radio module and antenna elements $282_1$ to $282_3$ are installed, and/or based on the current radio frequency (RF) band/s (e.g., 2.4 GHz or 5 Ghz) currently being used for wireless communications by radio module 280. As described herein, dynamic MIMO configuration logic 297 may be implemented to perform a one-time configuration of MIMO antenna elements 282, and/or may be implemented to perform reconfiguration of a previously configured MIMO configuration, e.g., in real time and on-the-fly as RF communication bands in current use by an information handling system change.

In this regard, it will be understood that the same configuration of radio module 280 may be installed in information handling system platforms having different chassis configurations that each have different RF interference characteristics. For example, relatively greater potential for RF interference to 2.4 GHz RF communications exist in a first system platform configuration where one or more of multiple antenna elements $282_1$ to $282_3$ are co-located adjacent an eDP noise source in a relatively small hinge cap cavity of a mobile information handling system such as notebook computer, while relatively lesser potential for RF interference to 2.4 GHz RF communications may exist in a second and different system platform configuration where multiple antenna elements $282_1$ to $282_3$ are co-located in a larger cavity (or different cavities) of a larger mobile information handling that has more room to sufficiently space all of antenna elements $282_1$ to $282_3$ away from eDP noise sources and from each other so as to substantially prevent RF noise interference in the 2.4 GHz band. Moreover, in the case of the first system platform configuration, little or substantially no RF interference to 5 GHz band communications may exist from the same eDP noise source that causes RF interference with 2.4 GHz communications. It will be understood that 2.4 GHz and 5 GHz frequency bands are just one exemplary combination of different first and second frequencies having different interference susceptibility. Thus in other embodiments, the disclosed systems and methods may be implemented for dynamic configuration and reconfiguration of multiple MIMO antenna elements of mobile information handling systems that are enabled to operate with combinations of two or more different frequency bands (e.g., other than 2.4 GHz and/or 5 GHz) that having different interference susceptibility to RF noise sources.

Figure 3:
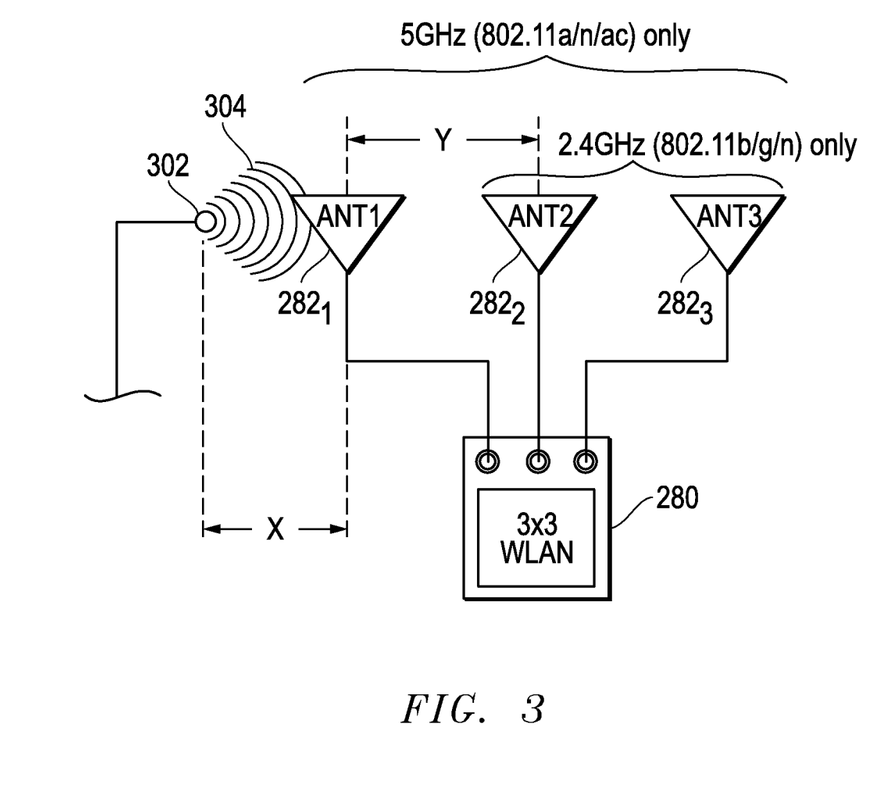
FIG. 3 illustrates one embodiment of dynamic MIMO antenna topology according to one exemplary embodiment of the disclosed systems and methods.

FIG. 3 illustrates one embodiment of dynamic MIMO antenna topology that may be implemented with a single 3×3 WLAN radio module 280 that includes multiple antenna elements $282_1$ to $282_3$ of FIG. 2 disposed in spaced relationship to each other and co-located on an information handling system platform near a RF noise source 302 (e.g., such as high speed eDP cable and connector). In this embodiment, antenna elements $282_1$ to $282_3$ are spaced apart from each other by a distance "Y" which is greater than or equal to a one quarter wavelength separation distance from each other in the 2.4 GHz RF frequency band, which is the minimum distance to ensure sufficiently interference free operation of the multiple antennas 282 in the 2.4 GHz RF frequency band. Additionally, antenna elements $282_2$ and $282_3$ are spaced apart from noise source 302 by a distance that is greater than a minimum distance (e.g., 25 millimeters) required to prevent undesired interference to 2.4 GHz RF communications from RF noise 304 produced by noise source 302.

However, antenna element $282_1$ is spaced apart from noise source 302 by a distance "X" which is which is less than a minimum distance (e.g., 25 millimeters) required to prevent undesired interference to 2.4 GHz RF communications from RF noise 304 produced by noise source 302. In this regard, Wi-Fi 2.4 GHz band (e.g., 802.11b/g/n) is directly affected by broadband noise of noise source 302 which compromises Wi-Fi signal integrity and will directly impact end-user experience due to the relatively close proximity of antenna $282_1$ to noise source 302, i.e., antenna $282_1$ is placed closer than 25 mm away from RF noise source 302. However, Wi-Fi 5 GHz band (e.g., 802.11a/n/ac) is not affected by broadband noise emitted from noise source 302, and thus 5 GHz Wi-Fi communications are capable of taking full advantage of all three antennas $282_1$ to $282_3$ of the 3×3 MIMO antenna configuration of FIG. 3 for maximum data throughput.

It will be understood that 25 millimeters is just one example of a recommended minimum keep out distance from an antenna element 282 to a low-voltage differential signaling (LVDS)/eDP cable such as noise source 302. However, in one embodiment the value of this minimum distance is an exemplary starting guideline only and that actual measured RF noise performance may dictate otherwise (e.g., a greater or lesser minimum distance) based on mechanical and ID constraints. It will also be understood that the minimum distance to ensure sufficiently interference free operation of the multiple antennas may be selected to meet the isolation/ECC specification for MIMO performance, and that this distance may also vary depending on antenna type, frequency band, mechanical environment, etc. Such a distance may be empirically measured in one embodiment, e.g., in a laboratory during system product development. Moreover, the minimum tolerable noise interference may vary per requirements or desires of a given wireless application, and therefore the minimum separation distance from a noise source 302 and antenna element 282 may vary and be selected accordingly.

In the illustrated embodiment of FIG. 3, baseband processing devices 290 and 292 may be configured to cooperatively implement dynamic MIMO configuration logic 297 of FIG. 2 to query the identity of the information handling system platform antenna configuration (e.g., in this case a 3×3 MIMO antenna configuration with antenna $282_1$ positioned within interference range of noise source 302) and to then respond to the characteristics of this configuration by cooperatively implementing dynamic MIMO configuration and/or reconfiguration to selectively enable only 2×2 MIMO antenna operation for Wi-Fi 2.4 GHz (e.g., 802.11b/g/n) wireless communication, i.e., antenna $282_1$ is selectively disabled and antennas $282_2$ to $282_3$ are enabled for 2.4 GHz communications to achieve full Wi-Fi signal integrity, albeit at a less than maximum possible 2×2 data throughput. However, baseband processing devices 290 and 292 may be configured to cooperatively implement dynamic MIMO configuration logic 297 of FIG. 2 to selectively enable the full 3×3 MIMO antenna operation of FIG. 3 for Wi-Fi 5 GHz (e.g., 802.11a/n/ac) wireless communications, i.e., all antennas $282_1$ to $282_3$ are enabled for 5 GHz communications to achieve maximum possible 3×3 data throughput for 5 GHz communications. It will be understood that in other embodiments a single baseband processing device, or more than two baseband processing devices, may be configured to similarly implement dynamic MIMO configuration and/or reconfiguration logic in a similar manner.

Figure 4:
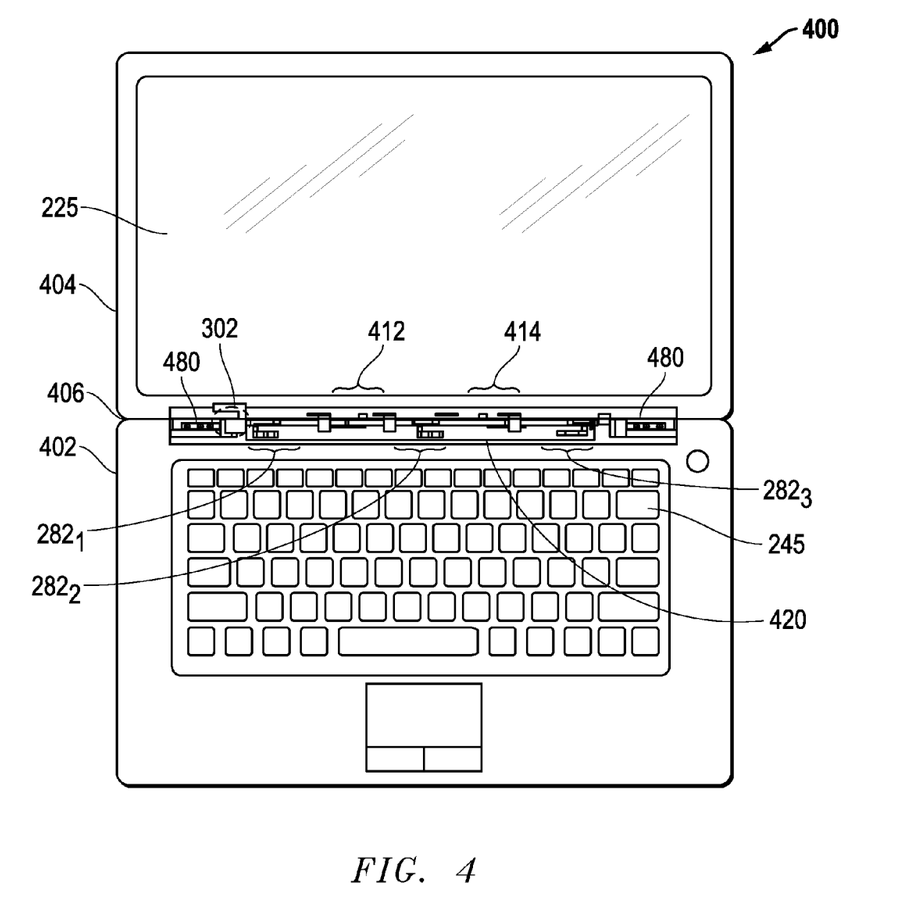
FIG. 4 illustrates an overhead sectional view of a mobile information handling system according to one exemplary embodiment of the disclosed systems and methods.

FIG. 4 illustrates an overhead sectional view of one exemplary embodiment of a mobile information handling system platform chassis 400 in the form of a notebook computer having a lid component 404 with integral display 225 that is hingeably coupled to a base component 402 (including integral keyboard 245) by hinges 480 at a hinge line 406. In the embodiment of FIG. 4, a hinge cavity 420 is defined in base component 402, and antenna elements $282_1$ to $282_3$ are co-located inside the hinge cavity 420 as shown together with ground isolators 412 and 414, hinges 480, and noise source 302 as shown. It is noted that a hinge cavity may alternatively or additionally be defined in similar manner adjacent to hinge line 406 but within lid component 404. In one embodiment, material/s (e.g., plastic) used to enclose the hinge cavity and the MIMO antennas 282 therein may be at least partially or completely transmissive to RF communications.

In the illustrated embodiment, antenna element $282_1$ is spaced by a minimum distance of one quarter wavelength at 2.4 GHz from antenna element $282_2$, and antenna element $282_2$ is spaced by a minimum distance of one quarter wavelength at 2.4 GHz from antenna element $282_3$. Thus, each of antenna elements $282_1$ to $282_3$ are spaced by a large enough distance from each of the other antenna elements 282 to ensure sufficient antenna isolation from each other. However, as shown in FIG. 4, antenna element $282_1$ is closely spaced (e.g., by less than 25 millimeters) of 2.4 GHz broadband noise source 302 that is positioned adjacent hinge cavity 320 as shown. As described in relation to the exemplary embodiment of FIG. 3, this close spacing of element $282_1$ to noise source 302 will cause interference to any Wi-Fi 2.4 GHz RF communications transmitted or received by antenna $282_1$, but will not cause interference to any Wi-Fi 5 GHz RF communications transmitted or received by antenna $282_1$ In this regard, RF noise interference corrupts (and can overtake) received signals in a weak signal environment, and may also corrupt the modulation of transmit signals as well. In either case, such RF noise interference may result in diminished, or loss of wireless connection for a user.

Figure 5:
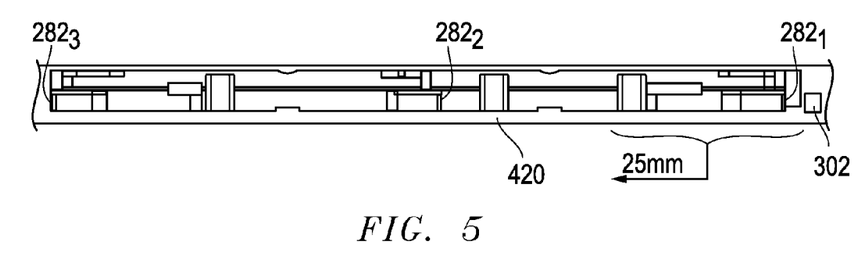
FIG. 5 illustrates a partial back end sectional view of a base component of a mobile information handling system according one exemplary embodiment of the disclosed systems and methods.

FIG. 5 illustrates a partial back end sectional view of base component 402 of FIG. 4, and show how far antenna element $282_1$ would have to be physically moved inwardly away from noise source 302 (e.g., in this example so as to be an inward distance of 25 millimeters away from noise source 302) to ensure adequate isolation from noise source 302 to allow substantially interference free Wi-Fi 2.4 GHz RF communications to be transmitted or received by antenna $282_1$. However, if antenna element $282_1$ is so repositioned inward and away from noise source 302, then 3×3 antenna isolation performance of antenna elements $282_1$ to $282_3$ would then be compromised and this is therefore not an optimal solution.

Figure 6:
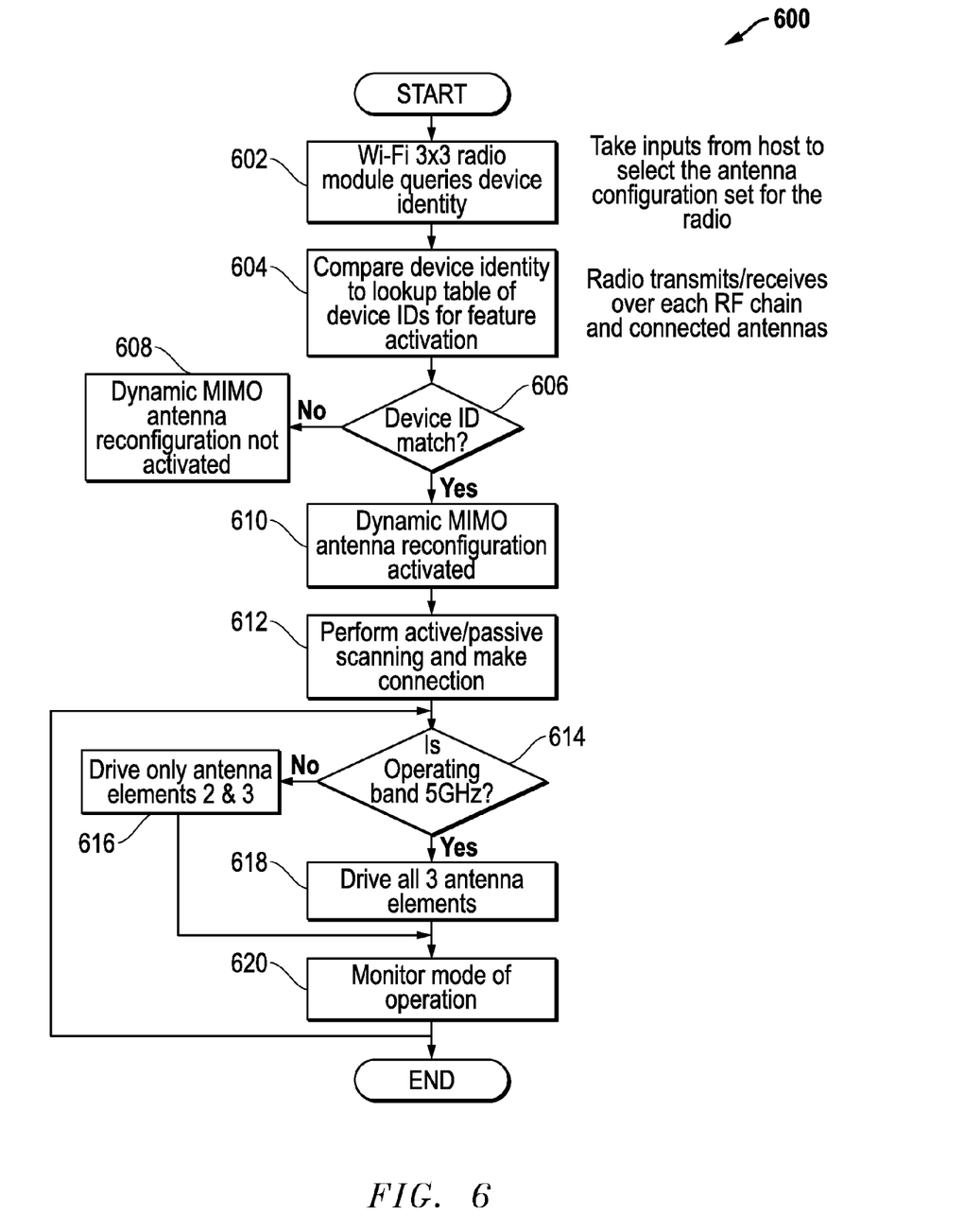
FIG. 6 illustrates methodology that may be implemented to dynamically configure and/or reconfigure MIMO antenna elements according to one exemplary embodiment of the disclosed systems and methods.

FIG. 6 illustrates one exemplary embodiment of methodology 600 that may be implemented (e.g., by dynamic MIMO configuration logic 297 of FIG. 2) to configure and/or reconfigure MIMO antenna elements 282 according to particular RF interference characteristics of a given information handling system 200 into which a radio module 280 has been inserted or otherwise operatively coupled. Methodology 600 may be performed, for example, upon an initial power up of an information handling system 200 with the presence of the current radio module 280, upon each power up of such an information handling system 200 and the radio module 280, upon enabling radio module 280 from disabled state, and/or in response to a user command received from a system user, etc. As shown, methodology 600 begins with step 602 where dynamic MIMO configuration logic 297 executing on one or more processing devices (e.g., baseband processing devices 290 and/or 292) of the radio module 280 queries other components of system 200 to learn the device identity of the given information handling system platform into which it is currently installed. Such device identity may be in the form of a device identifier (e.g., system SKU, system serial number, system model number, system tag number, etc.) or other information that is indicative of the identity of the given information handling system (e.g., such as information that describes system components and/or chassis characteristics) that is stored on system non-volatile memory (e.g., such as media drives 235) and provided to radio module 280 by host processing device 205, that is stored on embedded controller persistent storage 211 and provided to radio module 280 by EC 280, etc.

Next, dynamic MIMO configuration logic 297 executing on one or more baseband processing devices of radio module 280 may use the device identity determined in step 602 to determine whether to activate dynamic MIMO antenna reconfiguration capability. For example in steps 604 and 606, the queried system device identity of step 602 (e.g., device identifier number or other type of code) may be compared to a previously-stored look up table or other stored dynamic MIMO configuration indicator information that contains a list of particular system device identifies that require activation of dynamic MIMO antenna reconfiguration capability. Alternatively, such a look up table may contain a correlation between particular system device identifies and an indication of whether or not to activate dynamic MIMO antenna reconfiguration capability for each system device identity, e.g., such as illustrated in the exemplary lookup table of Table 1 below. In such an alternative embodiment, it is possible that more than two respective activation codes may be associated with more than two different respective system configurations having differing numbers of multiple antenna elements and/or noise source characteristics that are to be addressed using different dynamic MIMO reconfiguration settings and different subsets of active multiple antenna elements for different wireless bands. In any event, suitable dynamic MIMO configuration indicator information may be created during system design and/or fabrication and pre-stored in applicable non-volatile memory of system 200 for later retrieval by dynamic MIMO configuration logic 297 during execution of methodology 600.

TABLE 1

| System Device Identifier (ID) | Dynamic MIMO Reconfiguration Activation Code (1 = activate; 2 = not activate) |
|---|---|
| 000001 | 1 |
| 000002 | 2 |
| 000003 | 2 |
| 000004 | 1 |

In any case, activation of dynamic MIMO reconfiguration feature capability may be indicated for a particular system configuration such as illustrated in FIGS. 3 and 4, where the configuration includes one or more of system multiple antenna elements 282 that are located in a position/s (e.g., such as multiple antennas 282 co-located in small hinge cavity 420) that is susceptible to interference from adjacent system noise source's 302 in one or more RF frequency bands utilized for communication by the given system (e.g., such as Wi-Fi 2.4 GHz frequency band). However, no activation of MIMO dynamic reconfiguration feature capability may be indicated for a particular system configuration that includes multiple antenna elements 282 that are located in position/s that are not susceptible to interference from any adjacent system noise source/s (e.g., in one or more RF frequency bands utilized for communication by the given system. For example, an alternate system configuration of FIG. 4 that would not require activation of dynamic MIMO reconfiguration capability may include multiple spaced MIMO antennas 282 located adjacent the top of a lid component 404 away from hinge line 406 and at a distance of more than 25 millimeters away from any noise source 302.

If it is determined in step 606 that the queried system device identity of step 602 does not match a previously stored system device identity that requires activation of dynamic MIMO antenna reconfiguration capability, then methodology 600 terminates in step 608 where dynamic MIMO antenna reconfiguration is not activated, and normal radio module operation is enabled to drive all available MIMO antenna elements for all frequency bands, e.g., using all three antennas for both Wi-Fi 3×3 2.4 GHz and Wi-Fi 3×3 5 GHz operation. However, if in step 606 it is determined that the queried system device identity of step 602 matches a previously stored system device identity that requires activation of dynamic MIMO antenna reconfiguration capability such as system 200 of FIGS. 3 and 4, then methodology 600 proceeds to step 610 where dynamic MIMO antenna reconfiguration is activated. Methodology 600 then proceeds to step 612 where radio module 280 may perform applicable active/passive scanning operation as known in the art to find available wireless access point/s and then makes connection with those discovered available access points, or makes connection with those discovered available access points designated by a system user.

Next in step 614, it is determined if the real time currently used wireless communication band is an RF band that is substantially non-sensitive to RF interference from noise sources (e.g., such as a 5 GHz frequency band). If so, then methodology 600 proceeds to step 618 where all available MIMO antenna elements of system 200 are driven by radio module 280, e.g., using all three antennas 282 of FIGS. 3 and 4 for Wi-Fi 3×3 5 GHz operation. But in step 614 it is determined that the real time currently used wireless communication band is an RF band that is sensitive to RF interference from noise sources (e.g., such as a 2.4 GHz frequency band) then methodology 600 proceeds to step 616 where radio module 280 only drives a pre-designated subset of available MIMO antenna elements 282 of system 200, e.g., using only two antennas $282_2$ and $282_3$ of FIGS. 3 and 4 for Wi-Fi 3×3 2.4 GHz operation. In either case, methodology 600 proceeds to step 620 where operation mode of radio module 280 is monitored in real time and methodology 600 repeats to step 614 and iteratively repeats in a manner that dynamically responds by changing the number of enabled antennas 282 in real time based on changes in the current RF mode of radio module 280 between interference susceptible frequency band/s and non-interference susceptible frequency band/s, e.g., changes from Wi-Fi 3×3 2.4 GHz operation to Wi-Fi 3×3 5 GHz operation and back to Wi-Fi 3×3 2.4 GHz operation. Methodology 600 may end upon system shut-down, upon disabling of the radio module, etc.

It will be understood that the illustrated steps of methodology 600 are exemplary only, and that any other combination of additional, fewer and/or alternative steps may be employed that is suitable to configure and/or reconfigure MIMO antenna elements of an information handling system according to particular RF interference characteristics of a given information handling system within which a radio module operates. It will also be understood that methodology 600 may be employed to enable RF transmission and reception simultaneously for connected antenna elements of different RF chains.

It will also be understood that one or more of the tasks, functions, or methodologies described herein (e.g., including those described herein for components 108, 110, 112, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A mobile information handling system, comprising:
 a host processing device;
 at least two available multiple input, multiple output (MIMO) antenna elements; and
 at least one radio module coupled between the host processing device and each of the available MIMO antenna elements, the radio module including at least one processing device and being configured to at least one of: process and combine separate RF signals received in at least a common first frequency band from each of the available MIMO antenna elements to produce incoming data provided to the host processing device, or process outgoing data provided from the host processing device to produce and transmit separate RF signals in the common first frequency band from each of the available MIMO antenna elements, or a combination thereof;

where the processing device of the radio module is configured to determine an identity of a system chassis configuration of the mobile information handling system, and to then respond in real time to this determined identity by at least one of:

dynamically configuring, dynamically reconfiguring, or dynamically configuring and reconfiguring a subset of the available MIMO antenna elements that are actively utilized to receive separate RF signals in the common first frequency band based on the determined identity of the system chassis configuration and based on the identity of the common first RF frequency band to achieve a reduction in the amount of RF interference imparted to RF signals of the common first frequency band that are received by the subset of available MIMO antenna elements as compared to the amount of RF interference imparted to RF signals of the common first frequency band when the RF signals of the common first frequency band are received by all of the available MIMO antenna elements; or dynamically configuring, dynamically reconfiguring, or dynamically configuring and reconfiguring a subset of the available MIMO antenna elements that are actively utilized to transmit separate RF signals in the common first frequency band based on the determined identity of the system chassis configuration and based on the identity of the common first RF frequency band to achieve a reduction in the amount of RF interference imparted to RF signals of the common first frequency band that are transmitted by the subset of available MIMO antenna elements as compared to the amount of RF interference imparted to RF signals of the common first frequency band when the RF signals of the common first frequency band are transmitted by all of the available MIMO antenna elements; or a combination thereof.

2. The mobile information handling system of claim 1, further comprising at least one RF noise source; where each of the multiple MIMO antenna elements is positioned at a different distance from the RF noise source such that the RF noise source is positioned closer to a first one of the multiple MIMO antenna elements than to any other of the multiple MIMO antenna elements; where the RF noise source has a configuration that produces RF noise in the common first frequency band when the mobile information handling system is operating; where the system has a system chassis configuration that has given radio frequency (RF) interference characteristics associated with the identity of the system chassis configuration for the common first frequency band, the given RF interference characteristics for the common first frequency band including the position of the RF noise source for the common first frequency band relative to the first MIMO antenna element and where the processing device of the radio module is configured to:

dynamically configure, dynamically reconfigure, or dynamically configure and reconfigure a subset of the available MIMO antenna elements that are utilized to receive separate RF signals in the common first frequency band based on the interference characteristics of the system chassis configuration for the common first frequency band and based on the identity of the common first RF frequency band to achieve a reduction in the amount of RF interference imparted to RF signals of the common first frequency band that are received by the subset of available MIMO antenna elements as compared to the amount of RF interference imparted to RF signals of the common first frequency band when the RF signals of the common first frequency band are received by all of the available MIMO antenna elements; or dynamically configure, dynamically reconfigure, or dynamically configure and reconfigure a subset of the available MIMO antenna elements that are utilized to transmit separate RF signals in a common first frequency band based on the interference characteristics of the system chassis configuration for the common first frequency band and based on the identity of the common first RF frequency band to achieve a reduction in the amount of RF interference imparted to RF signals of the common first frequency band that are transmitted by the subset of available MIMO antenna elements as compared to the amount of RF interference imparted to RF signals of the common first frequency band when the RF signals of the common first frequency band are transmitted by all of the available MIMO antenna elements; or a combination thereof.

3. The mobile information handling system of claim 2, where the RF noise source has a configuration that produces substantially no RF noise in a different common second frequency band when the mobile information handling system is operating such that the system chassis configuration has different radio frequency (RF) interference characteristics associated with the identity of the system chassis configuration for the common second frequency band, the RF interference characteristics for the common second frequency band including no RF noise source for the common second frequency band positioned relative to any of the MIMO antenna elements; and where the processing device of the radio module is configured to:

dynamically configure, dynamically reconfigure, or dynamically configure and reconfigure all of the available MIMO antenna elements to be actively utilized to receive separate RF signals in the common second frequency band based on the interference characteristics of the system chassis configuration for the common second frequency band and based on the identity of the common second RF frequency band to achieve substantially the same amount of RF interference imparted to RF signals of the common second frequency band that are received by all of the available MIMO antenna elements as compared to the amount of RF interference imparted to RF signals of the common second frequency band when the RF signals of the common second frequency band are received by any subset of the available MIMO antenna elements; or dynamically configure, dynamically reconfigure, or dynamically configure and reconfigure all of the available MIMO antenna elements to be actively utilized to transmit separate RF signals in the common second frequency band based on the interference characteristics of the system chassis configuration for the common second frequency band and based on the identity of the common second RF frequency band to achieve substantially the same amount of RF interference imparted to RF signals of the common second frequency band that are transmitted by all of the available MIMO antenna elements as compared to the amount of RF interference imparted to RF signals of the common second frequency band when the RF signals of the common second frequency band are transmitted by any subset of the available MIMO antenna elements; or
a combination thereof.

4. The mobile information handling system of claim 3, where the common first frequency band is 2.4 GHz Wi-Fi band; and where the common second frequency band is 5 GHz Wi-Fi band.

5. The mobile information handling system of claim 1, where the at least one processing device of the radio module is further configured to:
process and combine separate RF signals received in a different common second frequency band from each of the available MIMO antenna elements to at least one of: produce incoming data provided to the host processing device, or process outgoing data provided from the host processing device to produce and transmit separate RF signals in the common second frequency band from each of the available MIMO antenna elements, or a combination thereof; and
respond in real time to the determined identity of the system chassis configuration by:
dynamically configuring, dynamically reconfiguring, or dynamically configuring and reconfiguring all of the available MIMO antenna elements to be actively utilized to receive separate RF signals in the common second frequency band based on the determined identity of the system chassis configuration and based on the identity of the common second RF frequency band; or
dynamically configuring, dynamically reconfiguring, or dynamically configuring and reconfiguring all of the available MIMO antenna elements to be actively utilized to transmit separate RF signals in the common second frequency band based on the determined identity of the system chassis configuration and based on the identity of the common second RF frequency band; or
a combination thereof.

6. The mobile information handling system of claim 5, where the common first frequency band is 2.4 GHz Wi-Fi band; and where the common second frequency band is 5 GHz Wi-Fi band.

7. The mobile information handling system of claim 5, where the amount of RF interference imparted to RF signals of the common second frequency band when received by any subset of the available MIMO antenna elements is substantially the same as the amount of RF interference imparted to RF signals of the common first frequency band when the RF signals of the common first frequency band are received by all of the available MIMO antenna elements; or where the amount of RF interference imparted to RF signals of the common second frequency band when transmitted by any subset of the available MIMO antenna elements is substantially the same as the amount of RF interference imparted to RF signals of the common second frequency band when the RF signals of the common first frequency band are transmitted by all of the available MIMO antenna elements; or a combination thereof.

8. The mobile information handling system of claim 1, where a system chassis configuration of the mobile information handling system comprises:
a lid component hingeably coupled to a base component by one or more hinges at a hinge line, a hinge cavity defined in at least one of the base component or lid component;
where each of the MIMO antenna elements and each of the hinges are contained in the hinge cavity, the MIMO antenna elements being disposed in spaced relationship relative to each other within the hinge cavity.

9. The mobile information handling system of claim 8, where the radio module and host processing device are contained within the base component; where the lid component includes an integral display component coupled to the host processing device by an embedded display port (eDP) component that is contained within the hinge cavity; where each of the multiple MIMO antenna elements is positioned at a different distance from the eDP component such that eDP component is positioned closer to a first one of the multiple MIMO antenna elements than to any other of the multiple MIMO antenna elements where the eDP component having has a configuration that produces RF noise in the common first frequency band when the mobile information handling system is operating to transmit signals across the eDP component; and where the processing device of the radio module is configured to determine the identity of the system chassis configuration of the mobile information handling system, and to then respond in real time to this determined identity by at least one of:
dynamically configuring, dynamically reconfiguring, or dynamically configuring and reconfiguring a subset of the available MIMO antenna elements that does not include the first MIMO antenna element to receive separate RF signals in the common first frequency band based on the determined identity of the system chassis configuration and based on the identity of the common first RF frequency band; or
dynamically configuring, dynamically reconfiguring, or dynamically configuring and reconfiguring a subset of the available MIMO antenna elements that does not include the first MIMO antenna element to transmit separate RF signals in the common first frequency band based on the determined identity of the system chassis configuration and based on the identity of the common first RF frequency band; or
a combination thereof.

10. The mobile information handling system of claim 9, where the eDP component having a configuration that produces substantially no RF noise in a different common second frequency band when the mobile information handling system is operating to transmit signals across the eDP component; and where the processing device of the radio module is configured to determine the identity of the system chassis configuration of the mobile information handling system, and to then respond in real time to this determined identity by at least one of:
dynamically configuring, dynamically reconfiguring, or dynamically configuring and reconfiguring all of the available MIMO antenna elements including the MIMO antenna element that is positioned closest to the eDP component to be actively utilized to receive separate RF signals in the common second frequency band based on the determined identity of the system chassis configuration and based on the identity of the common first RF frequency band; or
dynamically configuring, dynamically reconfiguring, or dynamically configuring and reconfiguring all of the available MIMO antenna elements to be actively utilized to transmit separate RF signals in the common second frequency band based on the interference characteristics of the system chassis configuration for the common second frequency band and based on the identity of the common second RF frequency band; or
a combination thereof.

11. The mobile information handling system of claim 10, where the common first frequency band is 2.4 GHz Wi-Fi band; where the common second frequency band is 5 GHz Wi-Fi band; where the mobile information handling system comprises at least three MIMO antennas within the hinge cavity.

12. A method of operating a mobile information handling system, comprising using at least one processing device of a radio module of the information handling system to:
process and combine separate RF signals received in at least a common first frequency band from each of at least two available multiple input, multiple output (MIMO) antenna elements to at least one of: produce incoming data provided to a host processing device of the information handling system, or process outgoing data provided from the host processing device to produce and transmit separate RF signals in the common first frequency band from each of the available MIMO antenna elements, or a combination thereof;
determine an identity of a system chassis configuration of the mobile information handling system; and
then respond in real time to the determined identity by at least one of:
dynamically configuring, dynamically reconfiguring, or dynamically configuring and reconfiguring a subset of the available MIMO antenna elements that are actively utilized to receive separate RF signals in the common first frequency band based on the determined identity of the system chassis configuration and based on the identity of the common first RF frequency band to achieve a reduction in the amount of RF interference imparted to RF signals of the common first frequency band that are received by the subset of available MIMO antenna elements as compared to the amount of RF interference imparted to RF signals of the common first frequency band when the RF signals of the common first frequency band are received by all of the available MIMO antenna elements; or
dynamically configuring, dynamically reconfiguring, or dynamically configuring and reconfiguring a subset of the available MIMO antenna elements that are actively utilized to transmit separate RF signals in the common first frequency band based on the determined identity of the system chassis configuration and based on the identity of the common first RF frequency band to achieve a reduction in the amount of RF interference imparted to RF signals of the common first frequency band that are transmitted by the subset of available MIMO antenna elements as compared to the amount of RF interference imparted to RF signals of the common first frequency band when the RF signals of the common first frequency band are transmitted by all of the available MIMO antenna elements; or
a combination thereof.

13. The method of claim 12, where the information handling system further comprises at least one RF noise source; where each of the multiple MIMO antenna elements is positioned at a different distance from the RF noise source such that the RF noise source is positioned closer to a first one of the multiple MIMO antenna elements than to any other of the multiple MIMO antenna elements; where the RF noise source has configuration that produces RF noise in the common first frequency band when the mobile information handling system is operating; where the system has a system chassis configuration that has radio frequency (RF) interference characteristics associated with the identity of the system chassis configuration for the common first frequency band, the RF interference characteristics for the common first frequency band including the position of the RF noise source for the common first frequency band relative to the first MIMO antenna element; and where the method further comprises:
operating the mobile information handling system to cause the noise source to produce noise in the common first frequency band; and
using the processing device of the radio module to:
dynamically configure, dynamically reconfigure, or dynamically configure and reconfigure a subset of the available MIMO antenna elements to receive separate RF signals in the common first frequency band based on the interference characteristics of the system chassis configuration for the common first frequency band and based on the identity of the common first RF frequency band to achieve a reduction in the amount of RF interference imparted to RF signals of the common first frequency band that are received by the subset of available MIMO antenna elements as compared to the amount of RF interference imparted to RF signals of the common first frequency band when the RF signals of the common first frequency band are received by all of the available MIMO antenna elements; or
dynamically configure, dynamically reconfigure, or dynamically configure and reconfigure a subset of the available MIMO antenna elements to transmit separate RF signals in a common first frequency band based on the interference characteristics of the system chassis configuration for the common first frequency band and based on the identity of the common first RF frequency band to achieve a reduction in the amount of RF interference imparted to RF signals of the common first frequency band that are transmitted by the subset of available MIMO antenna elements as compared to the amount of RF interference imparted to RF signals of the common first frequency band when the RF signals of the common first frequency band are transmitted by all of the available MIMO antenna elements; or
a combination thereof.

14. The method of claim 13, where the RF noise source has a configuration that produces substantially no RF noise in a different common second frequency band when the mobile information handling system is operating such that the system chassis configuration has different radio frequency (RF) interference characteristics associated with the identity of the system chassis configuration for the common second frequency band, the RF interference characteristics for the common second frequency band including no RF noise source for the common second frequency band positioned relative to any of the MIMO antenna elements; and where the method further comprises operating the processing device of the radio module to:
dynamically configure, dynamically reconfigure, or dynamically configure and reconfigure all of the available MIMO antenna elements to receive separate RF signals in the common second frequency band based on the interference characteristics of the system chassis configuration for the common second frequency band and based on the identity of the common second RF frequency band to achieve substantially the same amount of RF interference imparted to RF signals of the common second frequency band that are received by all of the available MIMO antenna elements as compared to the amount of RF interference imparted to RF signals of the common second frequency band when the RF signals of the common second frequency band are received by any subset of the available MIMO antenna elements; or dynamically configure, dynamically reconfigure, or dynamically configure and reconfigure all of the available MIMO antenna elements to transmit separate RF signals in the common second frequency band based on the interference characteristics of the system chassis configuration for the common second frequency band and based on the identity of the common second RF frequency band to achieve substantially the same amount of RF interference imparted to RF signals of the common second frequency band that are transmitted by all of the available MIMO antenna elements as compared to the amount of RF interference imparted to RF signals of the common second frequency band when the RF signals of the common second frequency band are transmitted by any subset of the available MIMO antenna elements; or a combination thereof.

15. The method of claim 14, where the common first frequency band is 2.4 GHz Wi-Fi band; and where the common second frequency band is 5 GHz Wi-Fi band.

16. The method of claim 12, further comprising using the at least one processing device of the radio module to:

process and combine separate RF signals received in a different common second frequency band from each of the available MIMO antenna elements to at least one of: produce incoming data provided to the host processing device, or process outgoing data provided from the host processing device to produce and transmit separate RF signals in the common second frequency band from each of the available MIMO antenna elements, or a combination thereof; and respond in real time to the determined identity of the system chassis configuration by:

dynamically configuring, dynamically reconfiguring, or dynamically configuring and reconfiguring all of the available MIMO antenna elements to be actively utilized to receive separate RF signals in the common second frequency band based on the determined identity of the system chassis configuration and based on the identity of the common second RF frequency band; or dynamically configuring, dynamically reconfiguring, or dynamically configuring and reconfiguring all of the available MIMO antenna elements to be actively utilized to transmit separate RF signals in the common second frequency band based on the determined identity of the system chassis configuration and based on the identity of the common second RF frequency band; or a combination thereof.

17. The method of claim 16, where the common first frequency band is 2.4 GHz Wi-Fi band; and where the common second frequency band is 5 GHz Wi-Fi band.

18. The method of claim 12, where a system chassis configuration of the mobile information handling system comprises:

a lid component hingeably coupled to a base component by one or more hinges at a hinge line, a hinge cavity defined in at least one of the base component or lid component;

where each of the MIMO antenna elements and each of the hinges are contained in the hinge cavity, the MIMO antenna elements being disposed in spaced relationship relative to each other within the hinge cavity;

where the radio module and host processing device are contained within the base component;

where the lid component includes an integral display component coupled to the host processing device by an embedded display port (eDP) component that is contained within the hinge cavity; where each of the multiple MIMO antenna elements is positioned at a different distance from the eDP component such that eDP component is positioned closer to a first one of the multiple MIMO antenna elements than to any other of the multiple MIMO antenna elements; and where the method further comprises transmitting signals across the eDP component to produce RF noise in the common first frequency band while the mobile information handling system is operating; using the processing device of the radio module to determine the identity of the system chassis configuration of the mobile information handling system; and then using the processing device of the radio module to then respond in real time to this determined identity by at least one of:

dynamically configuring, dynamically reconfiguring, or dynamically configuring and reconfiguring a subset of the available MIMO antenna elements that does not include the first MIMO antenna element to receive separate RF signals in the common first frequency band based on the determined identity of the system chassis configuration and based on the identity of the common first RF frequency band; or dynamically configuring, dynamically reconfiguring, or dynamically configuring and reconfiguring a subset of the available MIMO antenna elements that does not include the first MIMO antenna element to transmit separate RF signals in the common first frequency band based on the determined identity of the system chassis configuration and based on the identity of the common first RF frequency band; or a combination thereof.

19. The method of claim 18, further comprising transmitting signals across the eDP component to produce substantially no RF noise in a different common second frequency band; using the processing device of the radio module to determine the identity of the system chassis configuration of the mobile information handling system; and then using the processing device of the radio module to respond in real time to this determined identity by at least one of:

dynamically configuring, dynamically reconfiguring, or dynamically configuring and reconfiguring all of the available MIMO antenna elements including the MIMO antenna element that is positioned closest to the eDP component to be actively utilized to receive separate RF signals in the common second frequency band based on the determined identity of the system chassis configuration and based on the identity of the common first RF frequency band; or dynamically configuring, dynamically reconfiguring, or dynamically configuring and reconfiguring all of the available MIMO antenna elements to be actively utilized to transmit separate RF signals in the common second frequency band based on the interference characteristics of the system chassis configuration for the common second frequency band and based on the identity of the common second RF frequency band; or a combination thereof.

20. The method of claim 19, where the common first frequency band is 2.4 GHz Wi-Fi band; where the common second frequency band is 5 GHz Wi-Fi band; where the mobile information handling system comprises at least three MIMO antennas within the hinge cavity.

* * * * *